(12) United States Patent
Sakamaki et al.

(10) Patent No.: US 11,364,546 B2
(45) Date of Patent: Jun. 21, 2022

(54) CHUCK APPARATUS

(71) Applicant: YUKIWA SEIKO INC., Ojiya (JP)

(72) Inventors: Kazuo Sakamaki, Ojiya (JP); Koji Sakamaki, Ojiya (JP); Tadashi Taniguchi, Ojiya (JP); Kazuki Aoyagi, Ojiya (JP)

(73) Assignee: YUKIWA SEIKO INC., Ojiya (JP)

( * ) Notice: Subject to any disclaimer, the term of this patent is extended or adjusted under 35 U.S.C. 154(b) by 1078 days.

(21) Appl. No.: 15/775,276

(22) PCT Filed: Jul. 6, 2017

(86) PCT No.: PCT/JP2017/024757
§ 371 (c)(1),
(2) Date: May 10, 2018

(87) PCT Pub. No.: WO2018/105161
PCT Pub. Date: Jun. 14, 2018

(65) Prior Publication Data
US 2021/0170499 A1  Jun. 10, 2021

(30) Foreign Application Priority Data

Dec. 6, 2016  (JP) .............................. JP2016-236896

(51) Int. Cl.
*B23B 31/12* (2006.01)
(52) U.S. Cl.
CPC ........ *B23B 31/123* (2013.01); *B23B 31/1238* (2013.01); *B23B 2260/136* (2013.01)
(58) Field of Classification Search
CPC .............. B23B 31/123; B23B 31/1238; B23B 2260/136; B23B 2231/38
See application file for complete search history.

(56) References Cited

U.S. PATENT DOCUMENTS

| 2002/0000698 A1* | 1/2002 | Rohm ................. B23B 31/1207 |
| | | 279/62 |
| 2003/0042692 A1* | 3/2003 | Sakamaki ............. B23B 31/123 |
| | | 279/62 |

(Continued)

FOREIGN PATENT DOCUMENTS

| CN | 1093309 A | 10/1994 |
| CN | 2403525 Y | 11/2000 |

(Continued)

OTHER PUBLICATIONS

International Search Report for PCT/JP2017/024757, dated Sep. 19, 2017 (PCT/ISA/210).

(Continued)

*Primary Examiner* — Eric A. Gates
*Assistant Examiner* — Paul M Janeski
(74) *Attorney, Agent, or Firm* — Sughrue Mion, PLLC (57) ABSTRACT

Provided is a chuck apparatus enabling ease of rotation of a rotating cylinder in the loosening direction when replacing a tool, suppressed wear of the ratchet teeth, and a longer life span. Through the rotation of a rotating cylinder (1), the chuck apparatus expands or contracts a plurality of jaws (3) inserted into a hole (2*a*) provided to a tip end of a body (2), and sandwiches and holds a tool (4) using the jaws (3). An annular rotating body (8) screwed together with the jaws (3) and rotating together with the rotating cylinder (1) is fitted to the body (2) inside the rotating cylinder (1). Annular ratchet teeth (5) are provided to the body (2) or the rotating body (8), a detachable locking spring body (9) for locking with the ratchet teeth (5) is provided, and a lock release mechanism is provided for forcibly releasing the locking between the ratchet teeth (5) and the locking spring body (9) when a rotational force in a tightening direction is brought to zero after the rotating cylinder (1) has been rotated in the (Continued)

tightening direction and a holding force on the tool (4) has reached a predetermined value.

4 Claims, 7 Drawing Sheets

(56) References Cited

U.S. PATENT DOCUMENTS

2004/0021275 A1* 2/2004 Sakamaki ........... B23B 31/1238
279/62
2005/0258605 A1 11/2005 Tan

FOREIGN PATENT DOCUMENTS

| | | |
|---|---|---|
| CN | 1338344 A | 3/2002 |
| CN | 2723084 Y | 9/2005 |
| CN | 101041187 A | 9/2007 |
| CN | 201815693 U | 5/2011 |
| JP | 2005-305574 A | 11/2005 |
| JP | 2010-514574 A | 5/2010 |
| JP | 2010-260122 A | 11/2010 |
| WO | 2007/036082 A1 | 4/2007 |

OTHER PUBLICATIONS

Office Action dated Mar. 23, 2020 in Chinese Application No. 201780004556.X.
International Preliminary Report on Patentability issued Jun. 11, 2019 in International Application No. PCT/JP2017/024757.
Office Action dated Jul. 13, 2020 in Japanese Application No. 2016-236896, Machine Translation.

\* cited by examiner

CHUCK APPARATUS

CROSS REFERENCE TO RELATED APPLICATIONS

This application is a National Stage of International Application No. PCT/JP2017/024757 filed Jul. 6, 2017, claiming priority based on Japanese Patent Application No. 2016-236896, filed Dec. 6, 2016.

TECHNICAL FIELD

The present invention relates to a chuck apparatus.

BACKGROUND ART

As disclosed in patent document 1, in the past there have existed chuck apparatuses in which a rotating cylinder disposed in a body is caused to rotate, and jaws screwed together with a rotary nut that rotates together with the rotating cylinder are expanded or contracted and advanced or retracted by rotation of the rotary nut, and a tool is held by the jaws.

The chuck apparatus disclosed by patent document 1 is provided with an anti-slackness mechanism in which there are used ratchet teeth provided to the body, and a locking spring body that is provided between the rotating cylinder and the ratchet teeth and locks with the ratchet teeth. In a state in which the ratchet teeth and the locking spring body are locked, a portion of the locking spring body is fitted into a depression provided in an inner surface of the rotating cylinder, and the locked state is maintained.

Therefore, after rotating the rotating cylinder in a tightening direction, and locking the ratchet teeth and the locking spring body to cause the tool to be held by the jaws, when the tool is to be removed, the lock between the ratchet teeth and the locking spring body must be released prior to rotating the rotating cylinder in a loosening direction to expand and open the jaws.

To release the lock between the ratchet teeth and the locking spring body, the rotating cylinder must be twisted to cause the portion of the locking spring body to be ejected from the depression, and an appropriate amount of force is required to release the lock between the ratchet teeth and the locking spring body.

A problem is also presented in that wear of the ratchet teeth due to the locking between the locking spring body and the ratchet teeth is accelerated due to the locked state being maintained.

PRIOR ART DOCUMENTS

Patent Documents

[Patent Document 1] Japanese Laid-open Patent Publication No. 2005-305574

DISCLOSURE OF THE INVENTION

Problem to be Solved by the Invention

The present invention was conceived in light of the current state of the art as indicated above, it being an object thereof to provide a chuck apparatus of highly exceptional practical utility in which there is provided a lock release mechanism whereby, after the rotating cylinder has been rotated in the tightening direction and tightening has been completed, the lock between the ratchet teeth and the locking spring body is forcibly released when a user releases their hand and the rotational force in the tightening direction is brought to zero. As a consequence, it is simpler to rotate the rotating cylinder in the loosening direction when replacing the tool, and wear of the ratchet teeth is suppressed, so that the service life is increased.

Means for Solving the Problem

The main points of the present invention are described below with reference to the accompanying drawings.

A first aspect of the present invention relates to a chuck apparatus for expanding or contracting, by rotating a rotating cylinder 1, a plurality of jaws 3 inserted into a hole 2a provided to a tip end of a body 2, and sandwiching and holding a tool 4 using the jaws 3; the chuck apparatus being characterized in that an annular rotating body 8 screwed together with the jaws 3 and rotating together with the rotating cylinder 1 is fitted to the body 2 inside the rotating cylinder 1; annular ratchet teeth 5 are provided to the body 2 or the rotating body 8; a detachable locking spring body 9 for locking with the ratchet teeth 5 is provided; and a lock release mechanism is provided for forcibly releasing the lock between the ratchet teeth 5 and the locking spring body 9 when a rotational force in a tightening direction is set to zero after the rotating cylinder 1 has been rotated in the tightening direction and a holding force on the tool 4 has reached a predetermined value.

Furthermore, a second aspect of the present invention relates to the chuck apparatus of the first aspect, characterized by providing at an inner surface of the rotating cylinder 1, a pressing deformation part 11 for pressing and elastically deforming a to-be-pressed part 9a of the locking spring body 9 when the rotating cylinder 1 is rotated in the tightening direction, and adopting the lock release mechanism for forcibly releasing the locking between the ratchet teeth 5 and the locking spring body 9 by pushing back the pressing deformation part 11 via a repelling force due to restoral deformation of the to-be-pressed part 9a and rotating the rotating cylinder 1 in the loosening direction when the rotational force in the tightening direction is brought to zero after the rotating cylinder 1 has been rotated in the tightening direction and tightening has been completed.

Moreover, a third aspect of the present invention relates to the chuck apparatus of the first or second aspect, characterized by providing, at an inner surface of the rotating cylinder 1, a pressing part 10 for pressing the locking spring body 9 not locked with the ratchet teeth 5 to thereby lock the locking spring body 9 with the ratchet teeth 5 when the rotating cylinder 1 is rotated in the tightening direction in which the jaws 3 are contracted and closed.

Effect of the Invention

In being configured as described above, the present invention provides a chuck apparatus of highly exceptional practical utility, in which rotation of the rotating cylinder in the loosening direction when replacing a tool is facilitated, and wear of the ratchet teeth is suppressed, so that the service life is increased.

BEST MODE FOR CARRYING OUT THE INVENTION

Preferred embodiments for carrying out the present invention are briefly described below based on the drawings while presenting the operation of the present invention.

When the rotating cylinder 1 is rotated in the tightening direction to contract and close the jaws 3 and hold the tool 4, and then the user's hand is released from the rotating cylinder 1, the lock between the ratchet teeth 5 and the locking spring body 9 is automatically released by the lock release mechanism.

Accordingly, when the tool 4 that is held is to be removed, there is no need, prior to rotating the rotating cylinder 1 in the loosening direction, to apply an appropriate amount of force and twist the rotating cylinder 1 in order to eject from the depression the portion of the locking spring body 9 that has been fitted into the depression of the inner surface of the rotating cylinder 1 as is the case with the invention described by patent document 1. Instead, the rotating cylinder 1 can be immediately rotated in the loosening direction to expand and open the jaws 3.

Furthermore, wear to the ratchet teeth 5 can be suppressed, and a longer life span can be achieved by not continuously locking the locking spring body 9 and the ratchet teeth 5.

EMBODIMENTS

Embodiment 1

A specific Embodiment 1 of the present invention is described below based on FIG. 1 to FIG. 4.

Embodiment 1 is a chuck apparatus for expanding or contracting, by rotating a rotating cylinder 1, a plurality of jaws 3 inserted into a hole 2a provided to a tip end of a body 2, and clamping a tool 4 using the jaws 3; wherein annular ratchet teeth 5 are provided to the body 2; an annular rotating body 8 screwed together with the jaws 3 and rotating together with the rotating cylinder 1 is fitted to the body 2 inside of the rotating cylinder 1; a detachable locking spring body 9 that locks with the ratchet teeth 5 is provided outside of the ratchet teeth 5; the locking spring body 9 is provided in a state of rotating around the ratchet teeth 5 in association with rotation of the rotating body 8; the locking spring body 9 is attached to the rotating body 8 by recess-projection fitting means; a pressing part 10 for pressing the locking spring body 9 not locked with the ratchet teeth 5 to lock with the ratchet teeth 5 when the rotating cylinder 1 is rotated in the tightening direction in which the jaws 3 are contracted and closed, is provided to an inner surface of the rotating cylinder 1, and the locking spring body 9 does not lock with the ratchet teeth 5 when the rotating cylinder 1 is rotated in the loosening direction in which the jaws 3 are expanded and opened. There is also provided a lock release mechanism for forcibly releasing the lock between the ratchet teeth 5 and the locking spring body 9 when a rotational force in the tightening direction is brought to zero after the rotating cylinder 1 has been rotated in the tightening direction, the ratchet teeth 5 and the locking spring body 9 have been locked, and a holding force acting on the tool 4 has reached a predetermined value.

Embodiment 1 is used in electric powered rotary tools such as "hammer drills," which impart vibration and impact, vibration drills, and driver drills.

The body 2 is made of metal (e.g., from steel). As shown by FIG. 1 to FIG. 4, three jaws 3 are provided in an inclined state in the hole 2a formed in the body 2, and an annular nut body 6 screwed together with a threaded section 3a formed in the outer surface of the jaw 3 is provided in a state of being fitted onto the jaws 3.

Figure 1:
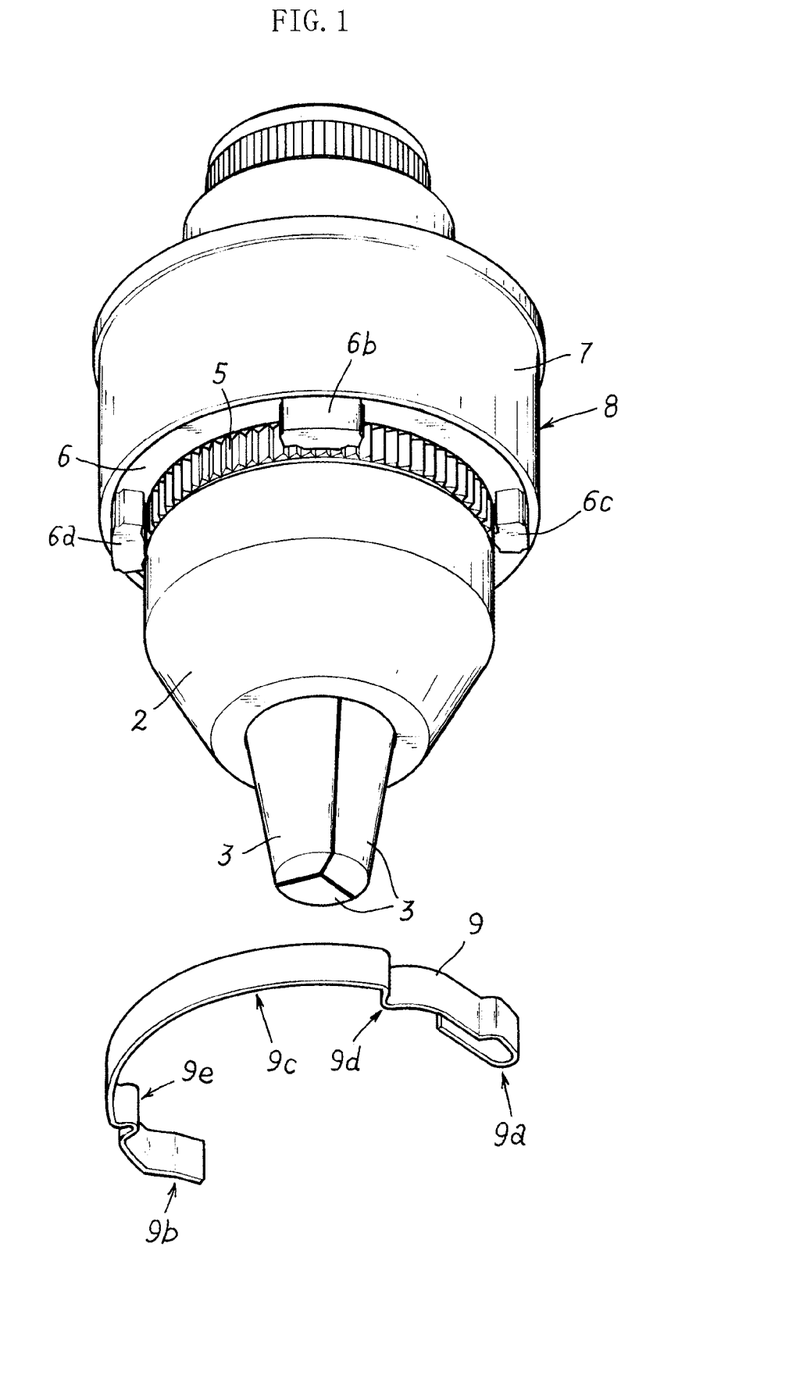
FIG. 1 is an exploded explanatory perspective view of Embodiment 1.

The nut body 6 is a split nut body 6, and is shape-retained by a shape retaining ring 7.

Note that the rotating body 8 set forth by the claims rotates together with the rotating cylinder 1, and is screwed together with the jaws 3, and, in the case of Embodiment 1, is configured from the nut body 6 and the shape retaining ring 7. Therefore, in Embodiment 1, a configuration is adopted in which the nut body 6 and the rotating cylinder 1 are coupled, and the nut body 6 is rotated by rotating the rotating cylinder 1. However, for example, a configuration may also be adopted in which the shape retaining ring 7 and the rotating cylinder 1 are coupled, and the shape retaining ring 7 and nut body 6 are rotated by rotating the rotating cylinder 1.

The nut body 6 is provided with four protrusions 6a 6b, 6c, 6d that lock with protrusions 16, 17 provided to the inner surface of the rotating cylinder 1 and transmit the rotational force of the rotating cylinder 1 to the nut body 6. The locking spring body 9 is attached to the protrusions 6a, 6b in a co-rotating state with respect to the nut body 6.

More specifically, in Embodiment 1, the locking spring body is attached such that a middle section 9c between a folded-back curved section 9a serving as the to-be-pressed part 9a formed by folding back a base end section into a U-shape, and a tip end locking section 9b of a tip end part, is fitted straddling two projections 6a, 6b. The locking spring body 9 is bent such that curved sections 9d, 9e, which counter-lock with outer end surfaces of the projections 6a, 6b are formed at both ends of the middle section 9c. The locking spring body 9 is attached in a co-rotating state with the nut body 6 by the curved sections 9d, 9e of the locking spring body 9 and the protrusions 6a, 6b of the nut body 6.

The attachment between the locking spring body 9 and the nut body 6 is not limited to the abovementioned configuration as long as the configuration is such that both are in a co-rotating state. Furthermore, Embodiment 1 is configured such that the locking spring body 9 is attached to the nut body 6 by recess-projection fitting means, but the configuration may also be such that the locking spring body 9 is attached to the shape retaining ring 7 by a recess-projection fitting means.

The annular ratchet teeth 5 meshing with the tip end locking section 9b of the locking spring body 9 are formed in the circumferential surface of the body 2 in front of the nut body 6. These ratchet teeth 5 engage with the tip end locking section 9b, and thereby a state in which the nut body 6 can rotate in only one direction (state in which reverse rotation is not possible) is created. The rotating cylinder 1 with the tip end contacting the body 2 is fitted onto the nut body 6, and the rotating cylinder 1 rotates together with the nut body 6.

The locking spring body 9 is made of metal (iron or steel), and is arranged in a state of being supported by the inner surface of the rotating cylinder 1 around the ratchet teeth 5. The rotational force of the rotating cylinder 1 is similarly transmitted even if conveyed via the shape retaining ring 7.

Figure 2:
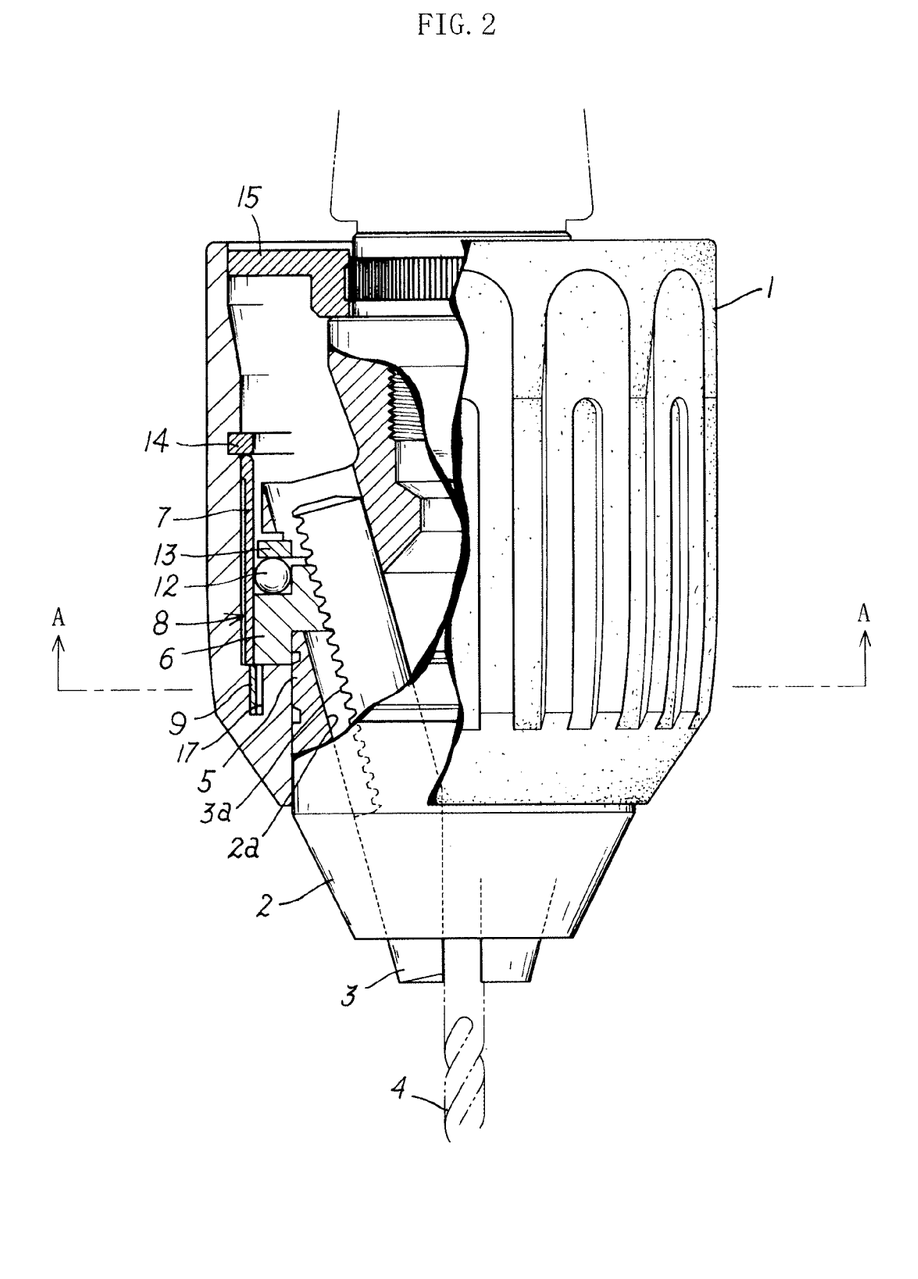
FIG. 2 is a front elevation view of Embodiment 1 with a portion cut away.
Figure 3:
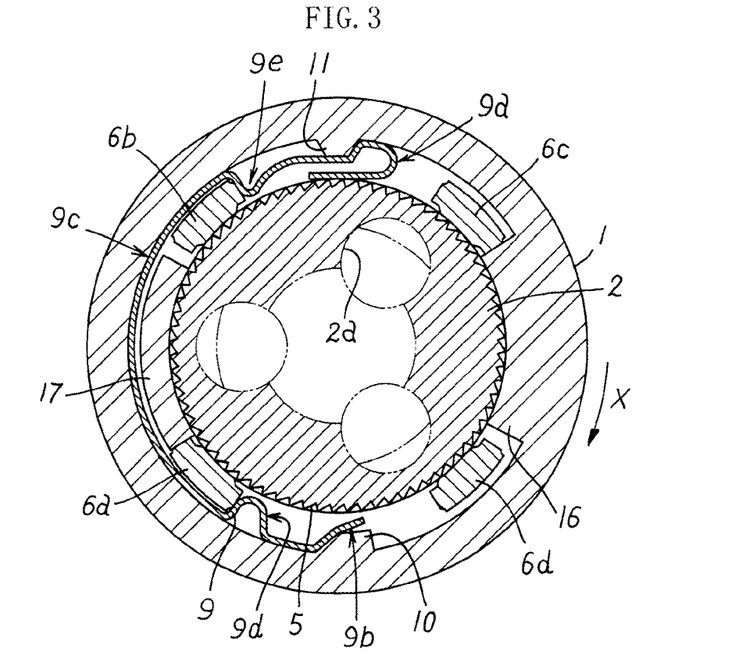
FIG. 3 is a cross-sectional view along A-A of FIG. 2.
Figure 4:
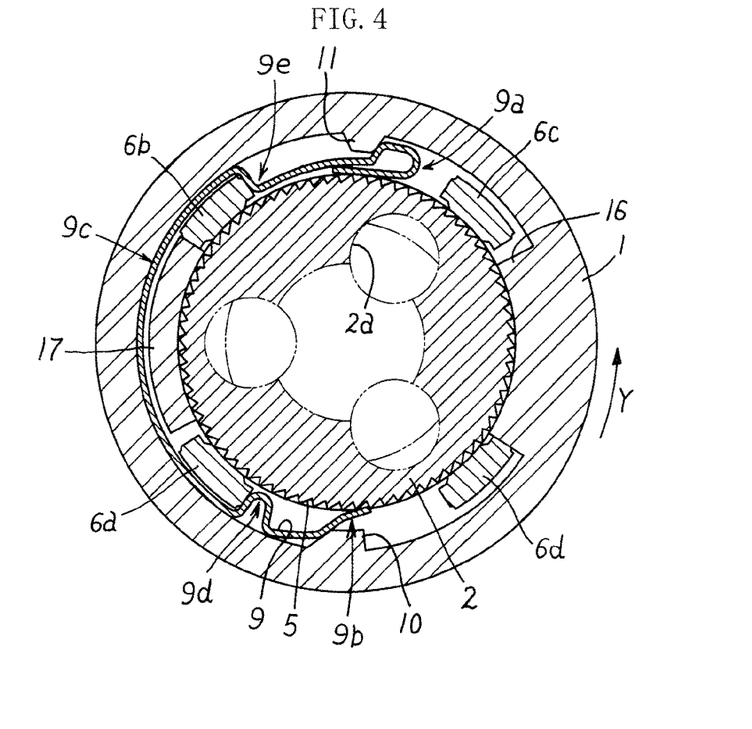
FIG. 4 is a cross-sectional view along A-A of FIG. 2.

As shown in FIGS. 2, 3 and 4, the tip end locking section 9b, which abuts the pressing part 10 and locks with the ratchet teeth 5, is provided to the tip end part of the locking spring body 9, and provided to the base end section thereof is the folded-back curved section 9a, which abuts the pressing deformation part 11. Note that the base end of the locking spring body 9 is configured so as to not lock with the ratchet teeth 5. The locking spring body 9 can be configured as described above by bending a band member, and can be economically produced merely thereby.

Also, the pressing part 10 provided to the inner surface of the rotating cylinder 1 is configured so that the outer surface of the locking spring body 9 is pressed by a tip end tapered surface, and the tip end locking section 9b of the locking spring body 9 is locked in the ratchet teeth 5.

The projection-shaped pressing deformation part 11, which presses and elastically deforms the folded-back curved section 9a of the locking spring body 9 when the rotating cylinder 1 is rotated in the tightening direction, is provided to the inner surface of the rotating cylinder 1.

The lock release mechanism is configured such that when the rotating cylinder 1 is rotated in the tightening direction (X direction) from a lock-released state shown in FIG. 3, in which the locking spring body 9 and the ratchet teeth 5 are not locked, and to the locked state shown in FIG. 4, and the holding force on the tool 4 reaches a prescribed value, at which point the user's hand is released from the rotating cylinder 1 (when the rotational force in the tightening direction is brought to zero after tightening has been completed), the pressing deformation part 11 is pressed back by a repelling force (restoring force) due to the restoral deformation of the folded-back curved section 9a, the rotating cylinder 1 is forcibly rotated in the loosening direction (Y direction), and the lock between the ratchet teeth 5 and the locking spring body 9 is forcibly released (becomes the state of FIG. 3).

Note that by configuring the pressing deformation part 11 and the folded-back curved section 9a as described above, the locked state between the locking spring body 9 and the ratchet teeth 5 is not maintained, but the jaws 3 and the nut body 6 are firmly screwed together by retightening, and therefore slackness is not produced even if the rotating cylinder 1 rotates somewhat in the loosening direction due to contact or the like.

A slippage prevention protruding ridge is formed on the outer surface of the rotating cylinder 1 (made of synthetic resin), and the rotating cylinder 1 is received by a receiving member 15 having a tip end provided to the body 2, and a rear end provided to the body 2.

Reference numeral 12 is a steel ball, and 13 is a steel ball receiver. The steel ball receiver 13 has elasticity, and therefore the matter of the rotating cylinder 1 rotating more than necessary in the tightening direction due to vibration or impact torque from an electric powered rotary tool is prevented. Reference numeral 14 is a C-shaped slip-off preventing ring of the rotating cylinder 1.

In being configured as described above, Embodiment 1 exhibits the following operational effects.

When the tool 4 is held by the jaws 3, and the rotating cylinder 1 is rotated, the rotating cylinder 1 and the nut body 6 rotate together until a predetermined load is applied to the rotating cylinder 1; therefore, the locking spring body 9 also rotates around the ratchet teeth 5.

When the rotating cylinder 1 is rotated to a prescribed position (position at which the jaws 3 abut the tool 4), a prescribed load acts on the rotating cylinder 1, and when the rotating cylinder 1 is further rotated from this state in the direction X shown in FIG. 3, the rotating cylinder 1 rotates with respect to the nut body 6, the pressing part 10 receiving the tip end locking section 9b of the locking spring body 9 presses the tip end locking section 9b, and the tip end locking section 9b locks with the ratchet teeth 5. Furthermore, the protrusion 16 abuts the end face of the protrusion 6d, and likewise, the protrusion 17 abuts the end face of the protrusion 6b such that the rotating cylinder 1 and the nut body 6 become integrated. When the rotating cylinder 1 is rotated, the tip end locking section 9b of the locking spring body 9 locked to the ratchet teeth 5 rides over the ratchet teeth 5 one tooth at a time by the plate spring action, and locks with a prescribed ratchet tooth 5 (in this state, reverse rotation does not occur due to the ratchet tooth 5), rotational resistance of the rotating cylinder 1 is strengthened, and tightening is completed (state of FIG. 4).

In the state of riding over one tooth at a time, tightening is not yet completed, and when tightening is completed, riding over the teeth does not occur.

Also, this fastened state is automatically released by the above-described lock release mechanism when the user's hand is removed from the rotating cylinder 1, and therefore in order to expand and open the jaws 3, the rotating cylinder 1 need merely be rotated in the loosening direction.

That is, when removing the tool 4 that is held, prior to rotating the rotating cylinder 1 in the loosening direction, there is no need to apply an appropriate amount of force and twist the rotating cylinder 1 in order to eject from the depression the portion of the locking spring body 9 that has descended and been fitted into the depression of the inner surface of the rotating cylinder 1 as is the case with the invention described by patent document 1. Instead, the rotating cylinder 1 can be immediately rotated in the loosening direction to expand and open the jaws 3.

Furthermore, wear to the ratchet teeth 5 can be suppressed, and a longer life span can be achieved, by not continuously locking the locking spring body 9 and the ratchet teeth 5.

Hence, Embodiment 1 is highly exceptional in practical utility, enabling ease of rotation of the rotating cylinder in the loosening direction when replacing a tool, and suppressing wear to the ratchet teeth, thereby enabling a longer life span.

Embodiment 2

A specific Embodiment 2 of the present invention is described below based on FIG. 5 to FIG. 9.

Figure 5:
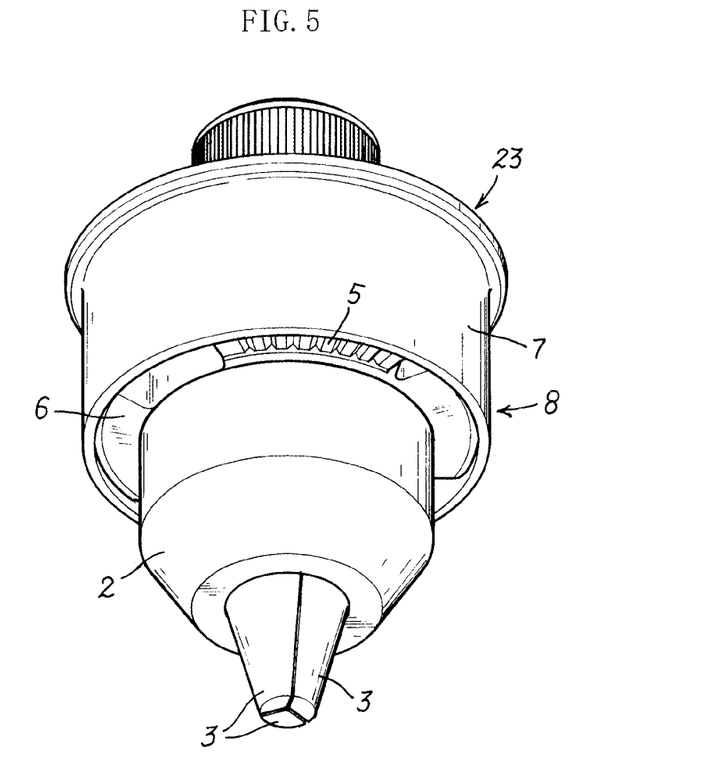
FIG. 5 is an exploded explanatory perspective view of Embodiment 2.
Figure 6:
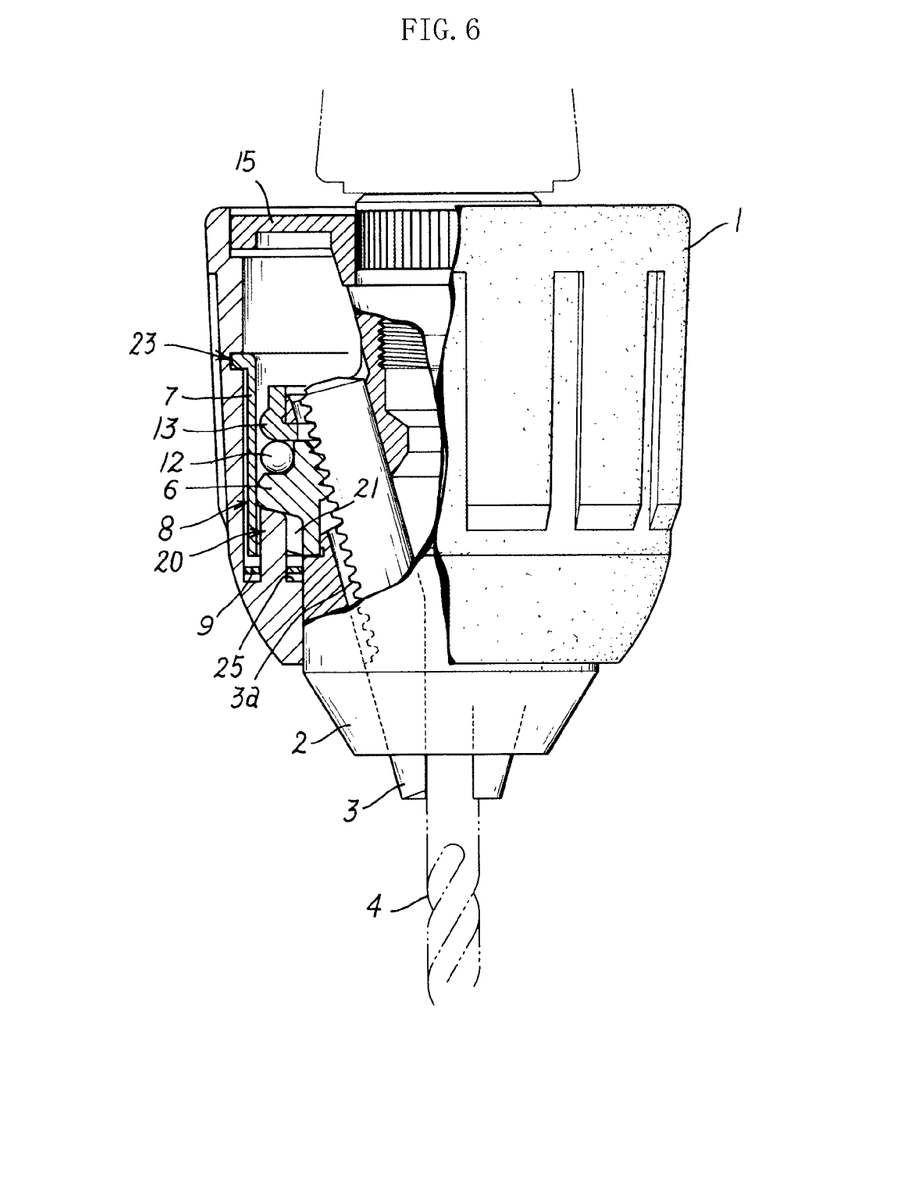
FIG. 6 is a front elevation view of Embodiment 2 with a portion cut away.

As shown in FIGS. 5 and 6, Embodiment 2 is an example in which the ratchet teeth 5 of Embodiment 1 are provided to the rotating body 8 rather than the body 2.

More specifically, the configuration is such that the ratchet teeth 5 are provided in a semicircular arc-shape on a tip end surface of the nut body 6 of the rotating body 8, the locking spring body 9 is held between the ratchet teeth 5 and a tip end part inner surface (upward surface 25) of the opposing rotating cylinder 1, and the locking spring body 9 and the ratchet teeth 5 are locked.

Two recesses 21 are provided to a 180° interval in the tip end surface of the nut body 6 in order to respectively lock with two protrusions 20 provided to the upward surface 25 of the tip end part of the rotating cylinder 1, and transmit the rotational force of the rotating cylinder 1 to the nut body 6.

Also, in Embodiment 2, a detachment prevention part 23 is provided protruding from the base end side of the shape retaining ring 7, and the shape retaining ring 7 is locked to the rotating cylinder 1 by the detachment prevention part 23 in a manner preventing detachment.

The locking spring body 9 in Embodiment 2 is a thin plate shaped annular member made of metal, and is provided with: the to-be-pressed part 9a projecting upwards and either locking with the tip end surface of the nut body 6 or arranged in a recess 24 provided to the tip end surface of the nut body 6; the locking section 9b, which projects upward and locks with the ratchet teeth 5; and a projection 9f, which projects downward and locks with the upward surface 25 of the rotating body 1.

More specifically, the to-be-pressed part 9a, locking section 9b, and projection 9f are formed by inserting notches in the locking spring body 9 (thin plate), and bending and causing to project upward or downward locations surrounded (on three sides) or sandwiched by the notches. Note that reference numeral 9g is a window hole through which the protrusion 20 is passed. Also, the projection 9f may be a shape obtained by bending downward at an approximately right angle a cantilever belt-shaped location surrounded on three sides by a notch, and furthermore, folding back and bending a midway section thereof such that the tip end is in proximity of the thin plate. In this case, the projection 9f can be favorably formed even when the hardness of the thin plate is high.

With the locking spring body 9, when the rotating cylinder is rotated in the tightening direction, the projection 9f projecting below the locking spring body 9 is pressed by a tapered surface that serves as both the pressing part 10 and the pressing deformation part 11 of a recess 22 provided in the upward surface 25 of the rotating cylinder 1, the locking spring body 9 moves upward and is pressed to the ratchet teeth 5 side, and thereby the locking section 9b projecting upward locks with the ratchet teeth 5, and a state in which reverse rotation is not possible is created. At the same time, the to-be-pressed part 9a is pressed against the tip end surface of the nut body 6 or the edge of the recess 24 and is deformed.

Accordingly, when the user's hand is removed from the rotating cylinder 1, the locking between the ratchet teeth 5 and the locking section 9b is automatically released by the restoring force of the to-be-pressed part 9a. By providing the recess 24 and the to-be-pressed part 9a that is arranged in the recess 24 when the lock is released, automatic releasing of the lock of the locking spring body 9 with the ratchet teeth 5 is favorably performed.

Figure 7:
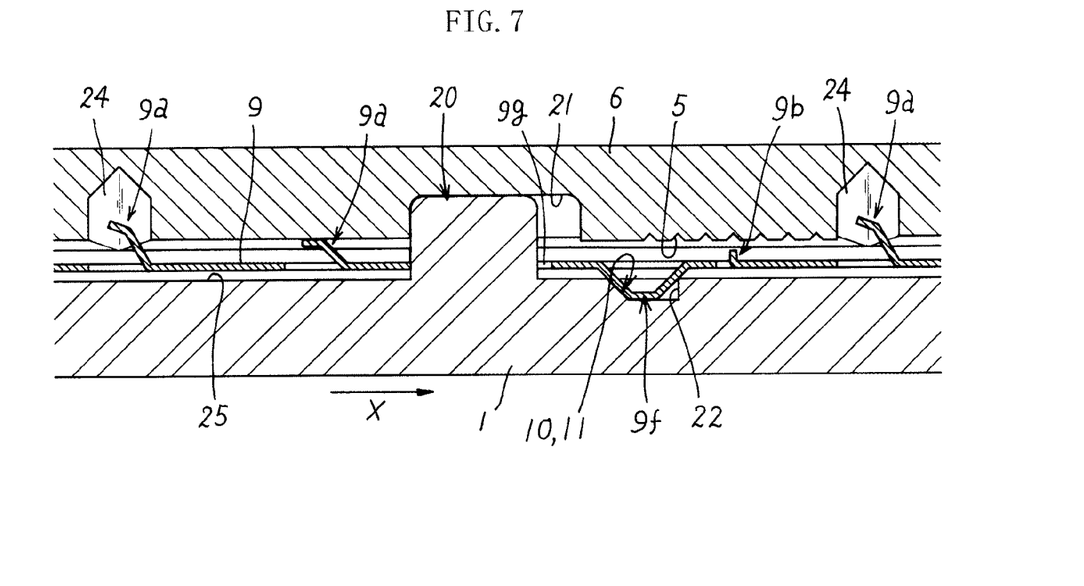
FIG. 7 is an expanded view of the locking spring body of Embodiment 2 and surrounding members thereof.
Figure 8:
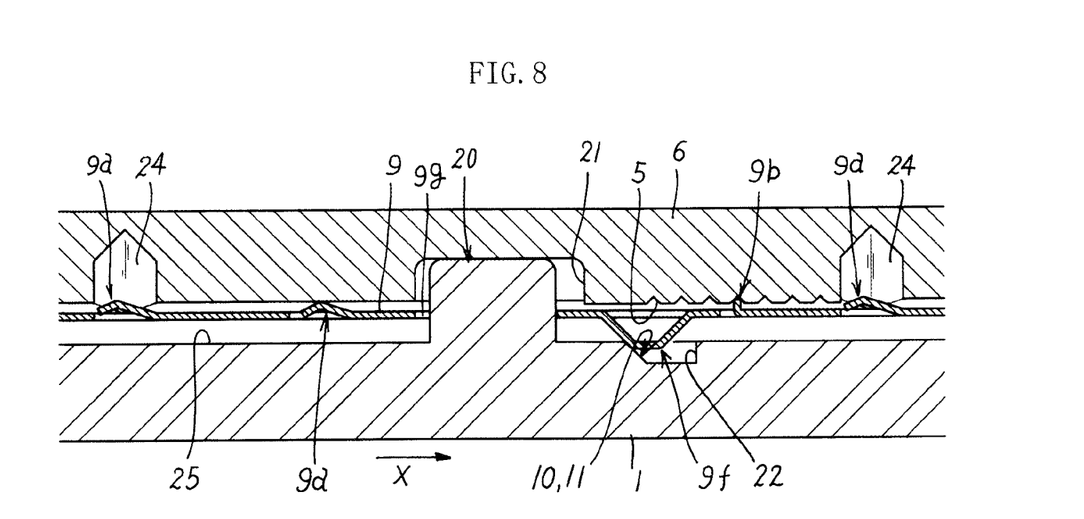
FIG. 8 is an expanded view of the locking spring body of Embodiment 2 and surrounding members thereof.
Figure 9:
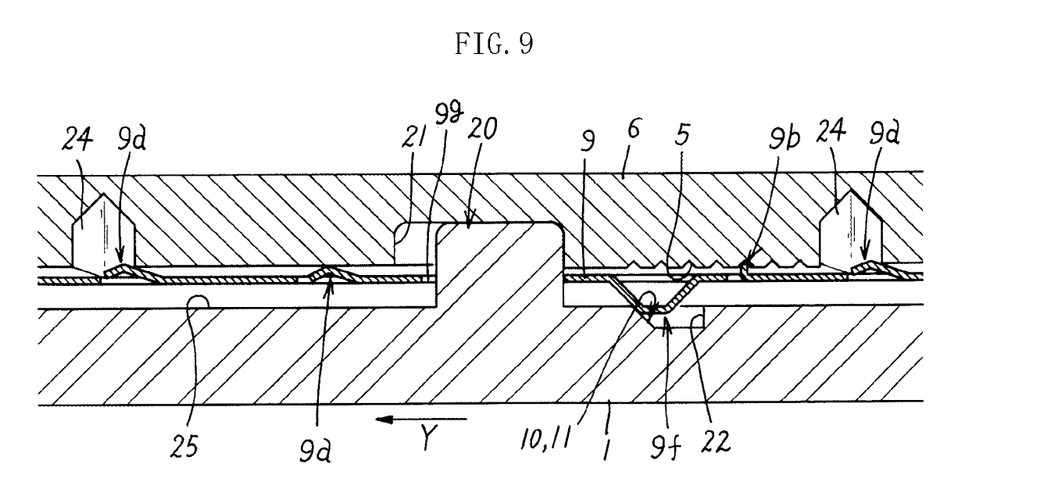
FIG. 9 is an expanded view of the locking spring body of Embodiment 2 and surrounding members thereof.

Namely, the lock release mechanism is configured such that, after the rotating cylinder 1 has been rotated in the tightening direction (X direction) from a lock-released state shown in FIG. 7 in which the locking spring body 9 and the ratchet teeth 5 are not locked to the locked state shown in FIG. 8, and the rotating cylinder 1 has been further rotated to retighten at a state like that shown in FIG. 9, then when the user's hand is released from the rotating cylinder 1 (when the rotational force in the tightening direction is brought to zero after tightening has been completed), the pressing deformation part 11 (tapered surface of the recess 22) is pressed back by a repelling force (restoring force) due to the restoral deformation of the to-be-pressed part 9a, the rotating cylinder 1 is forcibly rotated in the loosening direction (Y direction), and the lock between the ratchet teeth 5 and the locking spring body 9 is forcibly released (to become the state of FIG. 7).

The remainder is the same as Embodiment 1.

The invention claimed is:

1. A chuck apparatus for expanding or contracting, by rotating a rotating cylinder, a plurality of jaws inserted into a hole provided to a tip end of a body, and sandwiching and holding a tool using the jaws; said chuck apparatus comprising:
    an annular rotating body screwed together with the jaws and rotating together with the rotating cylinder is fitted to the body inside of the rotating cylinder;
    annular ratchet teeth provided to the body or the rotating body;
    a detachable locking spring body for locking with the ratchet teeth; and
    a lock release mechanism for forcibly disengaging the ratchet teeth and the locking spring body when a rotational force in a tightening direction is brought to zero after the rotating cylinder has been rotated in the tightening direction.

2. The chuck apparatus according to claim 1, further comprising, at an inner surface of the rotating cylinder, a pressing deformation part for pressing and elastically deforming a to-be-pressed part of the locking spring body when the rotating cylinder is rotated in the tightening direction, and adopting the lock release mechanism for forcibly disengaging the ratchet teeth and the locking spring body by pushing back the pressing deformation part via a repelling force due to restoral deformation of the to-be-pressed part and rotating the rotating cylinder in the loosening direction when the rotational force in the tightening direction is brought to zero after the rotating cylinder has been rotated in the tightening direction and tightening has been completed.

3. The chuck apparatus according to claim 2, characterized by providing, at an inner surface of the rotating cylinder, a pressing part for pressing the locking spring body not locked with the ratchet teeth to thereby lock the locking spring body with the ratchet teeth when the rotating cylinder is rotated in the tightening direction in which the jaws are contracted and closed.

4. The chuck apparatus according to claim 1, characterized by providing, at an inner surface of the rotating cylinder, a pressing part for pressing the locking spring body not locked with the ratchet teeth to thereby lock the locking spring body with the ratchet teeth when the rotating cylinder is rotated in the tightening direction in which the jaws are contracted and closed.

* * * * *